United States Patent [19]

Gupta

[11] 4,110,515
[45] Aug. 29, 1978

[54] METHOD OF PREPARING COMPOSITE BODY AND SECONDARY BATTERY OR CELL INCORPORATING SUCH COMPOSITE BODY

[75] Inventor: Nirmal K. Gupta, Canton, Mich.

[73] Assignee: Ford Motor Company, Dearborn, Mich.

[21] Appl. No.: 772,617

[22] Filed: Feb. 28, 1977

[51] Int. Cl.² .................................................. C04B 37/00
[52] U.S. Cl. ......................................... 429/104; 156/89
[58] Field of Search ............................. 156/89; 429/104

[56] References Cited

U.S. PATENT DOCUMENTS

| | | | |
|---|---|---|---|
| 3,811,943 | 5/1974 | Minck et al. | 429/104 |
| 3,982,957 | 9/1976 | Jones et al. | 429/104 |
| 3,982,959 | 9/1976 | Partridge et al. | 429/104 |

*Primary Examiner*—Caleb Weston
*Attorney, Agent, or Firm*—Roger L. May; Keith L. Zerschling

[57] ABSTRACT

A method of preparing a composite body comprising a vitreous carbon substrate having a felt prepared from materials selected from the group consisting of metal, carbon and graphite bonded to a major surface thereof, wherein said method comprises (A) forming and curing a branched polyphenylene prepolymer having a number average molecular weight of between about 500 and 800 and bearing terminal acetylene functionality to form a shaped, crosslinked body; (B) preparing a solution of said branched polyphenylene prepolymer in an organic solvent in an amount ranging from about 1 to about 60 parts by weight of said prepolymer per 100 parts by weight of said solution; (C) preparing a composite of said shaped body and said felt to be bonded thereto with said solution interposed therebetween; and (D) firing said composite in an inert atmosphere at a temperature of at least about 800° C until the polymer in said solution and said shaped body is converted to vitreous carbon and said shaped body is integrally bonded to said graphite felt. The composite body so formed may be employed in a secondary battery or cell wherein the felt serves as a cathodic electrode and the shaped body serves as a current collector.

11 Claims, 1 Drawing Figure

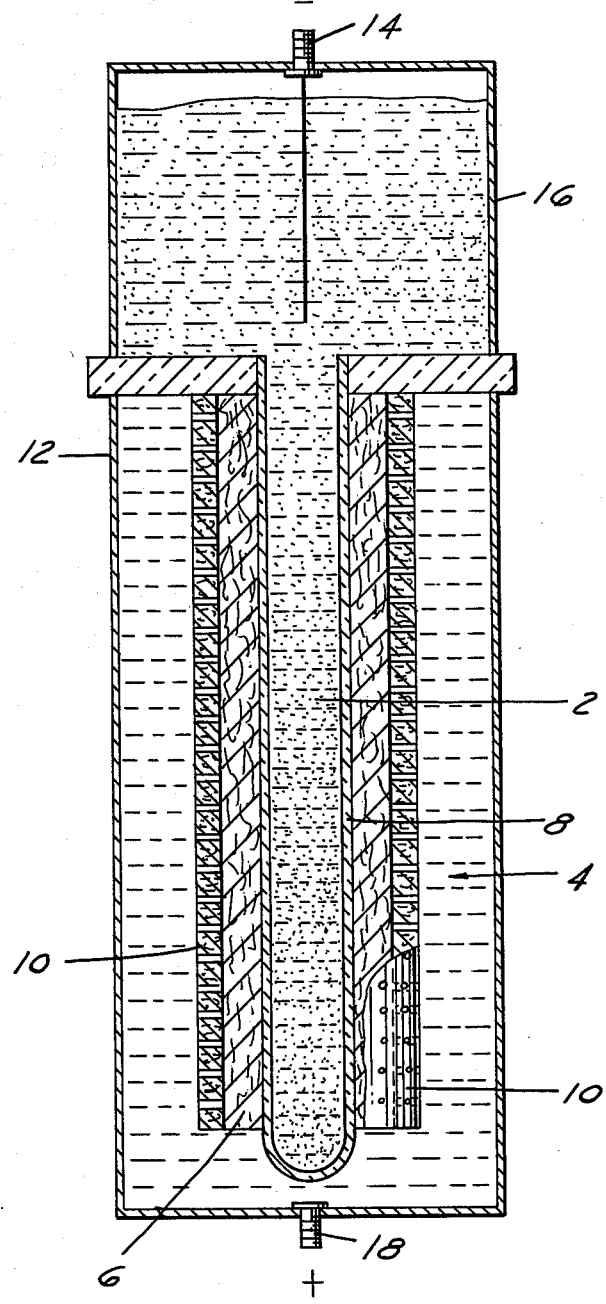

METHOD OF PREPARING COMPOSITE BODY AND SECONDARY BATTERY OR CELL INCORPORATING SUCH COMPOSITE BODY

The invention herein described was made in the course of or under a contract or subcontract thereunder with the National Science Foundation.

The invention herein described relates to a method for preparing a composite body comprising a substrate having a felt prepared from materials selected from the group consisting of metal, carbon and graphite bonded to a major surface thereof.

More particularly, this invention relates to an improved secondary battery or cell incorporating such a composite body.

Still more particularly, this invention relates to an improved sodium/sulfur battery or cell incorporating such a composite body.

BACKGROUND OF THE INVENTION

A recently developed type of secondary battery or rechargeable electrical conversion device comprises: (A) an anodic reaction zone containing a molten alkali metal reactant-anode, e.g., sodium, in electrical contact with an external circuit; (B) a cathodic reaction zone containing (a) a cathodic reactant comprising a liquid electrolyte, e.g., sulfur or a mixture of sulfur and molten polysulfide, which is electro-chemically reversibly reactive with said anodic reactant and (b) a porous felt electrode prepared from a material selected from metal, carbon and graphite; (C) a solid electrolyte comprising a cation-permeable barrier to mass liquid transfer interposed between and in contact with said anodic and cathodic reaction zones; and (D) a current collector or backup electrode. The felt electrode is in electrical contact with the cation-permeable barrier and also in electrical contact with the current collector or backup electrode which, in turn, is in electrical contact with the external circuit.

As used herein, the term "reactant" is intended to mean reactants and reaction products.

In a battery or cell of the above type the current collector or backup electrode and the porous cathodic electrode must make good contact in order to complete the electrical circuit. Generally, this may be accomplished by bonding the electrode and the current collector such as with a conductive cement. In prior art devices, the current collector or backup electrode has been prepared from conductive material such as graphite or various metals. However, the metals as well as the graphite are subject to some corrosion or build up of corrosion products and the bond between the current collector/backup electrode and the felt has been subject to failure due to degradation of the bonding cement. Both of these problems have resulted in a cell or battery of diminished capacity.

It is an object of this invention to prepare a composite body in which a current collector or backup electrode is integrally bonded to a cathodic felt electrode in such a manner that the composite does not suffer from the above corrosion problems or failure of a bonding medium.

Thus, it is a primary object of this invention to prepare such a secondary battery or cell of increased capacity compared to batteries or cells in which a felt electrode is bonded by a bonding cement to a corrodible or porous current collector subject to buildup of corrosion products.

BRIEF DESCRIPTION OF THE INVENTION

These objects and other more detailed objects which will be apparent to those skilled in the art are accomplished by the invention herein described, which comprises a method of preparing a composite body comprising a substrate having a felt, prepared from materials selected from the group consisting of metal, carbon and graphite, bonded to a major surface thereof, wherein the method comprises: (A) forming and curing branched polyphenylene prepolymer having a number average molecular weight of between about 500 and about 800 and bearing terminal acetylene functionality to form a shaped, crosslinked body; (B) preparing a solution of said branched polyphenylene prepolymer in an organic solvent in an amount ranging from about 1 to about 60 parts by weight of said prepolymer per 100 parts by weight of said solution; (C) preparing a composite of said shaped body and said felt to be bonded thereto with said solution interposed therebetween; and (D) firing said composite in an inert atmosphere at a temperature of at least 800° C until the polymer in said solution and said shaped body is converted to vitreous carbon and said shaped body is integrally bonded to said felt. The invention also relates to the use of such composite in a secondary battery or cell wherein the felt serves as the cathodic electrode and the shaped body serves as a current collector or backup electrode. It is also within the scope of the invention to bond such felts to both major surfaces of the substrate rather than to only one and to use such a composite in a secondary cell or battery such that one felt serves as the cathodic electrode and the other felt is interposed between the current collector or backup electrode and the cell or battery container.

The invention will be more fully understood after reading the following detailed description thereof in conjunction with the drawing which shows a vertical sectional view of a battery or cell in which the composite formed by the method of the invention may be employed.

DETAILED DESCRIPTION OF THE INVENTION

In accordance with the invention a shaped body is prepared by forming and curing or crosslinking a branched polyphenylene prepolymer. The polyphenylene prepolymer employed in the invention is disclosed in British Pat. No. 1,398,142 assigned to Hercules, Inc., the disclosure of which is hereby incorporated by reference. An exemplary structure of such polyphenylene resins, which have an average number molecular weight between about 500 and about 800 and which bear terminal acetylene functionality, is represented by Formula I. Such materials, which are hard, low density, thermosetting resins crosslinkable through acetylene functionality and which can be melt fabricated at low temperatures and pressures, exhibit melt flow above 70° C in the non-cured form. To be considered fully cured the molded article should be exposed to temperatures of between about 220° C and 250° C for a short period of time. The non-cured prepolymer is soluble in many organic solvents including benzene, toluene, methyl ethyl ketone, tetrahydrofuran, and chloroform.

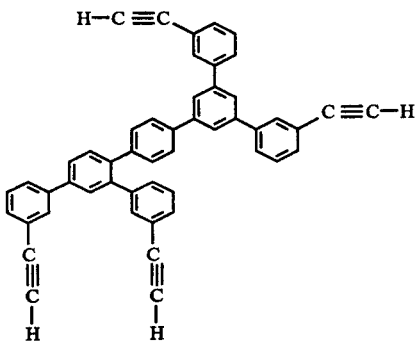

The polyphenylene resins useful in the method of the invention may be shaped in a number of different ways which will be apparent to those skilled in the art. For example, the shaped body may be prepared by cold forming followed by heating at elevated temperatures to crosslink the resin or, alternatively, the shaped body may be prepared by hot pressing the prepolymer.

After formation of the shaped body, a composite of that body so formed and the felt with a bonding layer of a solution of said same polyphenylene resin in an organic solvent interposed therebetween is prepared. Solvents suitable for preparing the solution include: methanol, ethanol, benzene, toluene, methyl ethyl ketone, tetrahydrofuran and chloroform. The polyphenylene prepolymer is included in the solvent in an amount ranging from 1 to 60 parts by weight of the polyphenylene resin per 100 parts by weight of the solution. In the formation of the preferred composite, the solution, which serves as a bonding medium, may be applied to those portions of the shaped body to which the felt is to be bonded and the felt may then be positioned against the surface of the body, i.e., a felt on one major surface thereof or several felts, one on each of the major surfaces thereof, and maintained there during the firing operation. Alternatively, the prefired composite of felt and the shaped body may be prepared by coating and partially impregnating the felt and then positioning the felt against the surface of the body and maintaining it there during the firing operation. Still further, the composite may be prepared by applying the solution to both the felt and those portions of the shaped body to which the felt is to be bonded and then positioning the felt or felts and the surface together and maintaining them in that position during the firing operation.

The composite so formed is next fired in an inert atmosphere, e.g., argon, at a temperature of at least about 800° C for sufficient time to convert the polymer in the solution and in the shaped body to vitreous carbon and thereby create a composite wherein the shaped body is integrally bonded to the felt by a continuum of vitreous carbon.

As will be appreciated by those skilled in the art, vitreous carbon is a relatively new form of carbon which gains its name from its similarity to glass in both appearance and fracture. Each atom in the diamond lattice of vitreous carbon is joined by covalent links to four other atoms surrounding it at the corners of a regular tetrahedron. Vitreous carbon is prepared by the thermal degradation of selected organic polymers of which the polyphenylene resins disclosed herein have been found to be suitable. Because of its good electrical conductivity, the vitreous carbon forms an excellent electronic bond between the felt and the current collector body.

The integrally bonded composite prepared in accordance with the method of this invention is ideally suited for use in a secondary battery or cell of the type represented by the FIGURE. As shown therein, the cell comprises: an anodic reaction zone 2 containing a molten alkali metal reactant-anode in electrical contact with an external circuit; cathodic reaction zone 4 containing (a) a cathodic reactant comprising a liquid electrolyte which is electrochemically reversibly reactive with said anodic reactant and (b) a porous felt electrode 6 prepared from material selected from the group of metal, carbon and graphite; a cation-permeable barrier 8 to mass liquid transfer interposed between and in contact with said anodic and cathodic reaction zones; and a current collector or backup electrode 10 which, in turn, is in electrical contact with the external circuit. In the exemplary cell of the Figure tubular cation-permeable barrier 10 is disposed internally of tubular container 12 so as to create the anodic reaction zone 2 within the cation-permeable barrier and the cathodic reaction zone 4 between the interior of container 12 and the exterior of barrier 8. The anodic reactant is in electrical contact with the external circuit via terminal 14 which is in electrical contact with the anodic reactant contained in the alkali metal reservoir 16, which, in turn, is in sealed relationship with container 12. The contact between the cathodic electrode and the current collector is made via terminal 18 to the external circuit.

The secondary or rechargeable electrical conversion devices of which the Figure is representative, and various components thereof are well known to those skilled in the art and are disclosed in a number of United States patents including the following: U.S. Pat. Nos. 3,404,035; 3,404,036; 3,413,150; 3,446,677; 3,458,356; 3,468,709; 3,468,719; 3,475,220; 3,475,223; 3,475,225; 3,535,163; 3,719,531; 3,811,493; 3,951,686; 3,966,492; 3,976,503; 3,980,496; 3,985,575; 3,985,576; 3,993,503; 3,994,745; 4,002,806; and 4,002,807.

The anodic reactant employed in such device is an alkali metal which is maintained above its melting point when the device is in operation. The anodic reactant is heated by any conventional means including, but not by way of limitation, Joule heating, induction heating, and heat exchange with a suitable fluid. The anodic reactant may also be viewed as the anode proper or conductor through which the electron flow to the external circuit is achieved. A cell component of this type is conventionally referred to in the art as a sacrificial electrode in that while it is serving the role of a conductor it is also undergoing an electrochemical reaction. Molten sodium is employed as the anodic reactant in the most preferred embodiments of such devices. However, potassium, lithium and other alkali metals mixtures of such alkali metals, or alloys containing such alkali metals may be used. Of course, certain of said alkali metals are better suited for use with certain cationpermeable barriers.

The cathodic reactant is a molten material, e.g., molten sulfur, which is electrochemically reversibly reactive with the anodic reactant. As the device begins to discharge, the mole fraction of elemental sulfur drops while the open cell voltage remains constant. During this portion of the discharge cycle, as the mole fraction of sulfur drops from 1.0 to approximately 0.72 the cathodic reactant displays two phases, one being essentially pure sulfur and the other being sulfur saturated alkali metal polysulfide in which the mole ratio of sulfur to alkali metal is about 5.2:2. When the device is discharged to the point where the mole fraction of sulfur is about 0.72, the cathodic reactant becomes one phase in nature since all elemental sulfur has formed polysulfide salts. As the device is discharged further, the cathodic reactant remains one phase in nature and as the mole faction of sulfur drops, so does the open circuit voltage corresponding to the change in the potential determining reaction. Thus, the device continues to discharge from a point where polysulfide salts contain sulfur and alkali metal in a mole ratio of approximately 5.2:2 to the point where polysulfide salts contain sulfur and alkali metal in a ratio of about 3:2. At this point the device is fully discharged.

The anodic reactant is separated from the cathodic reactant by a solid barrier to mass liquid transfer that is selectively ionically conductive with respect to cations of the anodic reactant and substantially impermeable to other ions which may be stored in the cathodic reactant. Thus, the reaction zone separator or solid electrolyte is a material which will permit the transfer of the ions of the anodic reactant through the separator and into the cathodic reactant during operation of the device. The cathodic reactant together with thhe separator provides a sufficient barrier to free electron flow in the internal portion of the electrical circuit to permit a difference of potential to develop at the respective electrodes of the device in operation. It is preferred that the separator be as thin as possible without unduly sacrificing strength. Although optimum thickness may vary with intended use, separators having a thickness in the range of about 20 to about 2000, preferably about 100 to about 1000, microns have been found to be effective.

Both glass and polycrystalline ceramic materials have been found suitable for use in such devices as the cation-permeable barrier or reaction zone separator. The various glasses which are suitable as cation-permeable barriers are described in many of the aforementioned patents. The glasses disclosed therein may be prepared by conventional glass making procedures using the ingredients described therein and firing at temperatures of about 2700° F.

The polycrystalline ceramic materials useful as cation-permeable barriers are bi- or multi-metal oxides. Such materials are described in a number of the aforementioned patents. Among the most preferred of these materials are those in the family of beta-type alumina, all of which exhibit a generic crystalline structure which is readily identifiable by x-ray diffraction. Thus, beta-type alumina or sodium beta-type alumina is a material which may be thought of as a series of layers of aluminum oxide held apart by columns of linear Al-O bond chains with sodium ions occupying sites between the layers and columns. Among the numerous useful polycrystalline beta-type-alumina materials are: (1) standard beta-type alumina; (2) boron oxide ($B_2O_3$) modified beta-type alumina; (3) substituted beta-type-alumina; and (4) beta-type alumina which is modified by the addition of a minor proportion by weight of metal ions having a valence not greater than 2.

EXAMPLE

Two cells (E23 and E24) were prepared. Cell E23 employed a UF4S graphite leaky screen (porous graphite body) as the current collector/backing electrode while cell E24 has a vitreous carbon leaky screen. Both cells were operated at 300° C and at charge/discharge current densities of 0.125/0.250 A/cm$^2$. In the case of the UF4S graphite cell, the capacity remained betweel 1.1 and 1.3 amp hours and was not affected by changed in cutoff voltages. The capacity of the vitreous carbon cell depended on the cutoff voltages and varied between 0.6 and 2.0 amp hours. In general, the capacity of the vitreous carbon cell was substantially higher than the UF4S cell.

Post test examination of cells E23 and E24 revealed that the corrosion of vitreous carbon leaky screen was very small as compared to that of the UF4S graphite leaky screen.

In view of this disclosure, many modifications of this invention will be apparent to those skilled in the art. It is intended that all such modifications which fall within the scope of this invention be included within the terms of the appended claims.

I claim:

1. A method of preparing a composite body comprising a substrate having a felt prepared from materials selected from the group consisting of metal, carbon and graphite, bonded to a major surface thereof, wherein said method comprises:
   (A) forming and curing a branched polyphenylene prepolymer having a number average molecular weight of between about 500 and about 800 and bearing terminal acetylene functionality to form a shaped, crosslinked body;
   (B) preparing a solution of said branched polyphenylene prepolymer in an organic solvent in an amount ranging from about 1 to about 60 parts by weight of said prepolymer per 100 parts of said solution;
   (C) preparing a composite of said shaped body and said felt to be bonded to a major surface thereof with said solution interposed between said shaped body and said felt;
   (D) firing said composite in an inert atmosphere at a temperature of at least 800° C until the polymer in said solution and said shaped body is converted to vitreous carbon and said shaped body is integrally bonded to said felt.

2. A method in accordance with claim 1 wherein said composite of said felt and said shaped body is prepared by applying said solution to those portions of said shaped body to which said felt is to be bonded and positioning said felt against the surface of said body.

3. A method in accordance with claim 1 wherein said composite of said felt and said shaped body is prepared by coating and partially impregnating said felt and then positioning said felt against the surface of said body.

4. A method in accordance with claim 1 wherein said composite of said felt and said shaped body is prepared by applying said solution to both said felt and those portions of said shaped body to which said felt is to be bonded and then positioning said felt against the surface of said body.

5. A method in accordance with claim 1 wherein said shaped body is formed by cold forming said branched polyphenylene prepolymer followed by curing said prepolymer at an elevated temperature.

6. A method in accordance with claim 1 wherein said shaped body is formed by hot pressing.

7. A method in accordance with claim 1 wherein said composite body comprises a vitreous carbon substrate having a felt bonded to each of the two major surfaces thereof each of said felts being applied in the same manner.

8. In a secondary battery or cell of the type comprising:
- (A) an anodic reaction zone containing a molten alkali metal reactant-anode in electrical contact with an external circuit;
- (B) a cathodic reaction zone containing (a) a cathodic reactant comprising a liquid electrolyte which is electrochemically reversibly reactive with said anodic reactant and (b) a porous felt electrode prepared from a material selected from the group consisting of metal, carbon and graphite;
- (C) a cation-permeable barrier to mass liquid transfer interposed between and in contact with said anodic and cathodic reaction zones; and
- (D) a current collector or back-up electrode, said felt electrode being in direct electrical contact with said cation-permeable barrier and in electrical contact with said current collector or back-up electrode which, in turn, is in electrical contact with said external circuit, wherein the improvement comprises a vitreous carbon current collector or back-up electrode which is integrally bonded to said electrode felt, which composite is prepared by a process comprising:
- (a) forming and curing a branched polyphenylene prepolymer having a number average molecular weight of between about 500 and about 800 and bearing terminal acetylene functionality to form a shaped, crosslinked body;
- (b) preparing a solution of said branched polyphenylene prepolymer in an organic solvent in an amount ranging from about 1 to about 60 parts by weight per 100 parts by weight of said solution;
- (c) preparing a composite of said shaped body and a felt prepared from a material selected from the group consisting of metal, carbon and graphite to be bonded thereto with said solution interposed therebetween; and
- (E) firing said composite in an inert atmosphere at a temperature of at least about 800° 1 C until the polymer in said solution and said shaped body is converted to vitreous carbon and said shaped body is integrally bonded to said felt.

9. A secondary battery or cell in with claim 8 wherein (i) said cell comprises a cell container and a tubular cation-permeable barrier which is disposed internally of said container so as to produce in anodic reaction zone internally thereof and a cathodic reaction zone between said cation-permeable barrier and said container and (ii) said current collector or backup electrode has openings therein through which said cathodic reactant may flow.

10. A secondary battery or cell in accordance with claim 8 wherein (i) said battery or cell comprises a battery or cell container and a tubular cation-permeable barrier which is disposed internally thereof so as to produce an anodic reaction zone internally thereof and a cathodic reaction zone between said cation-permeably barrier and said container and (ii) said composite of said felt and said current collector back-up electrode substantially fills said cathodic reaction zone, with said vitreous carbon collector or back-up electrode serving as a liner for said container.

11. A secondary battery or cell in accordance with claim 8 wherein (i) said battery or cell comprises a battery or cell container and a tubular cation-permeable barrier which is disposed internally thereof so as to produce an anodic reaction zone internally thereof and a cathodic reaction zone between said cation-permeable barrier and said container; (ii) said composite comprises felts prepared from a material selected from the group consisting of metal, carbon and graphite bonded to the two major surfaces of said vitreous carbon current collector or back-up electrode; and (iii) said composite substantially fills said cathodic reaction zone with one of said felts serving as the cathodic electrode and said other of said felts being interposed between said container and said current collector or back-up electrode.

* * * * *